Jan. 18, 1949.         J. M. TYRNER         2,459,253
REPRODUCING APPARATUS
Filed Nov. 29, 1944                    2 Sheets-Sheet 1

INVENTOR.
Joseph M. Tyrner
BY
ATTORNEYS

Jan. 18, 1949. J. M. TYRNER 2,459,253
REPRODUCING APPARATUS
Filed Nov. 29, 1944 2 Sheets-Sheet 2
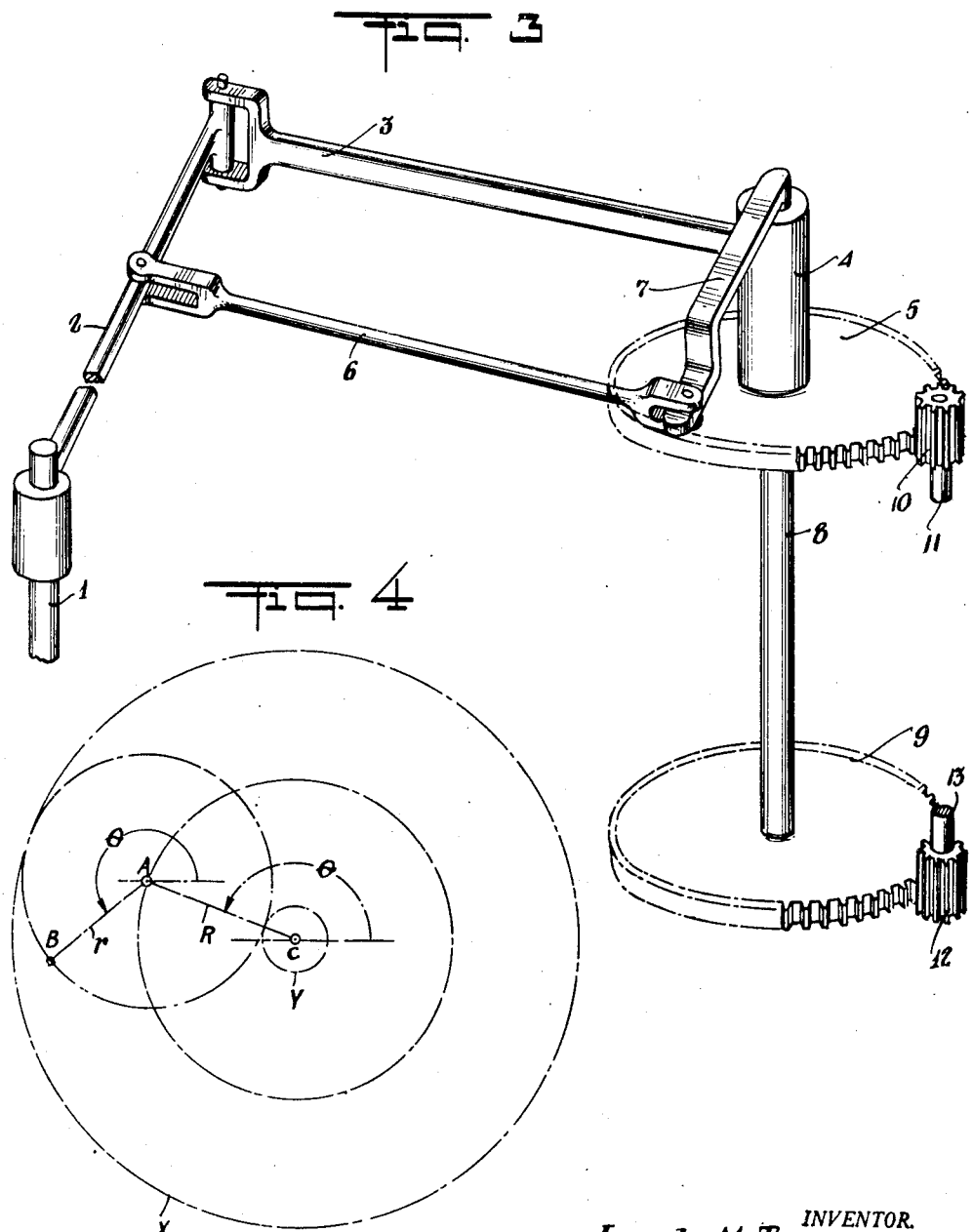
INVENTOR.
Joseph M. Tyrner
BY
ATTORNEYS Patented Jan. 18, 1949

2,459,253

UNITED STATES PATENT OFFICE 2,459,253

REPRODUCING APPARATUS

Joseph M. Tyrner, New York, N. Y., assignor to Air Reduction Company, Incorporated, New York, N. Y., a corporation of New York Application November 29, 1944, Serial No. 565,759

5 Claims. (Cl. 318—8)

This invention relates to apparatus for cutting metal and other material in accordance with a given pattern.

The apparatus was devised primarily for use in connection with the cutting of metal sheets or plates by means of an oxyacetylene cutting torch where it is desired to cut an opening in the plate, or an article from the plate, whose configuration is like that of the given pattern, but the invention has many other uses, as will later appear.

So-called universal cutting machines are in use by means of which an oxyacetylene cutting torch may be made to cut a metal plate or sheet according to a certain pattern. Such machines usually work on the pantograph or folding parallelogram principle, or double rectilinear motion principle. In any event, a tracer at one part of the machine is caused to trace the pattern or template, and the torch at another part of the machine simultaneously moves over the metal sheet or plate to cut in or from it an opening or article having the same configuration as the pattern or template. In this method of flame cutting, it is evident that the tracer and torch are mechanically connected and that the cutting is done by the torch simultaneously with the tracing of the pattern or template, and in the immediate vicinity thereof.

According to the present invention, the pattern or template is traced by a tracing device having no mechanical connection at all with the torch or other element which is to reproduce the pattern. The movements of the tracing element are translated into alternating current energy which is recorded on a record in the usual manner of electrically or photographically recording sound. Whenever it is desired to reproduce the pattern, in cutting metal plates or the like, the alternating current energy is regenerated from the record and is used to control the movement of a torch or the like and to cause it to follow a path which describes a geometric figure having the same configuration as the original pattern. Thus, the cutting operation does not take place simultaneously with the tracing of the pattern, but may be performed at any later time simply by using the record to control the movements of the torch or other cutting element. The cutting operation need not even take place in the same part of the building in which the pattern was originally traced but may be performed at any remote location and, of course, the record may be used over and over again, and each time the cut will have a configuration corresponding to that of the original pattern.

The accompanying drawings illustrate in more or less diagrammatic fashion one form of apparatus embodying the invention for tracing a pattern, making the record as above described, and reproducing the pattern from the record. In the drawings.

Figure 1:
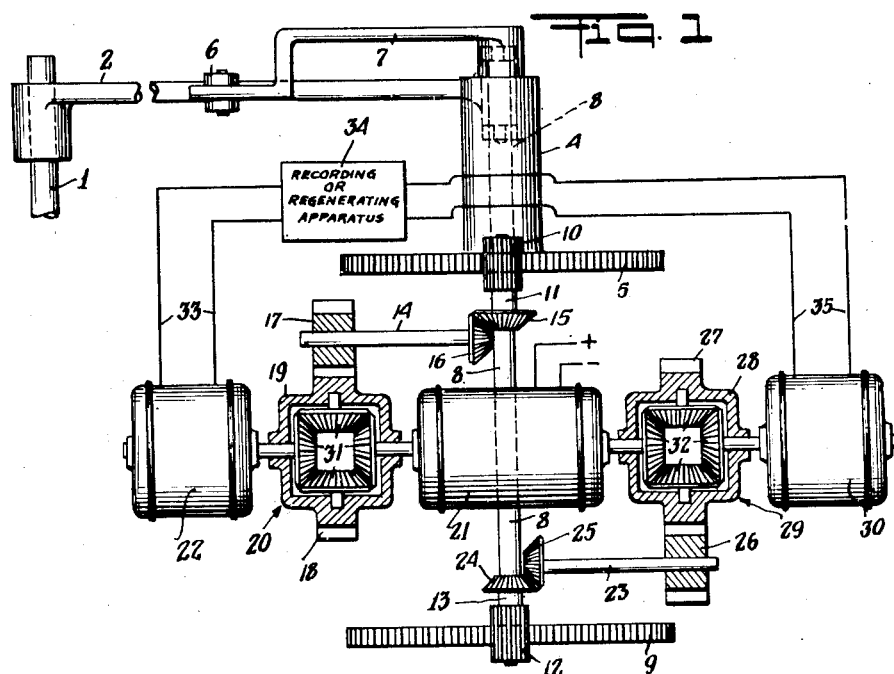
Fig. 1 is a side elevation of the apparatus, certain parts being shown in vertical section.

Fig. 3 is an enlarged perspective view of means that may be employed when the pattern is traced for transmitting the movements of the tracing element to the translating mechanism, and when the cutting operation is performed for imparting to the torch or other cutting element the proper movements to cause it to carry out the cutting operation in accordance with the original pattern; and Fig. 4 is an explanatory diagram illustrating the principle of operation of the tracing and reproducing means shown in Fig. 3.

In the apparatus of the invention, the movement of a tracing stylus is utilized to vary the normal output frequency of two sources of alternating current. This is preferably accomplished by utilizing the movement of the tracing stylus to vary the speed of two alternating current generators each of which at a normal speed delivers a normal constant output frequency of say, 60 cycles, when the tracing stylus is at a standstill or has no component of motion which alters its speed. When the speed of either generator is increased above its normal by motion of the tracing stylus, its normal output frequency is increased, and when its speed is decreased below its normal by motion of the tracing stylus, its normal output frequency is decreased. The two alternating currents of varying frequency are recorded on a record by any of the well known methods of electrical or photographically recording sound. The recording is preferably on the same record but in different tracks.

When it is desired to cut metal or the like in accordance with the original pattern, the record is operated to regenerate the two alternating currents of varying frequency which are utilized to operate two synchronous motors at varying speeds. The varying speeds of the two motors are made use of to control the motion of the torch or other cutting element and cause it to carry out the cutting operation in accordance with the original pattern.

The means employed for controlling the motion of the torch or other cutting device to cause it to carry out the cutting operation in accordance with the original pattern, is such that the position of the torch at any time is determined by rectangular, oblique or polar coordinates. The means employed when the pattern is originally traced for transmitting components of motion of the tracing stylus to the translating mechanism should be of the same type as the means employed to control the movement of the torch when the pattern is reproduced. The preferred form of such means which may be used for the two purposes is shown in perspective in Fig. 3, and its principle of operation is illustrated in Fig. 4. Referring first to Fig. 3 and assuming, for the time being, that the means therein illustrated is for reproducing the pattern, i. e. for causing a torch or the like to perform a cutting operation in accordance with the original pattern, 1 represents a portion of the torch or other element whose movement is to be controlled by the record. It is mounted at one end of an arm 2 which is pivoted at its other end to an arm 3. The arm 3 is connected to a sleeve 4 carrying a gear 5. A link 6 pivotally connects an intermediate portion of the arm 2 with the end of an arm 7 connected to a shaft 8 coaxially disposed with respect to the sleeve 4. The shaft 8 carries a second gear 9. The gear 5 meshes with a pinion 10 which is operatively connected by means of the shaft 11 with the translating mechanism as hereinafter described. Similarly, the gear 9 meshes with a pinion 12 on a shaft 13 which is also operatively connected to a part of the translating mechanism. When mechanical motion is transmitted from the translating apparatus to the pinions 10 and 12, it is obvious that they will turn the gears 5 and 9 to impart components of movement to the torch 1 due to the swinging movement of the arm 3 about the axis of its sleeve 4 and swinging movement of the arm 2 about the axis of its pivotal connection to the arm 3.

By reference to Fig. 4, it will be seen that when mechanism of this type is employed, the position of the torch 1, at any time, is determined by a system of polar coordinates. In Fig. 4 the two arms 3 and 2 are represented by the lines R and $r$, respectively. The point A represents the point at the end of arm 3 where the arm 2 is pivotally connected to it, and the point B represents the point at which the torch 1 is carried by the arm 2. The point C represents the axis about which the arm 3 swings. It will now be seen that the position of point A at any time will be determined by a set of polar coordinates having the pole C. The position of the point A is determined by the length of the radius vector R, which is constant, and the vectorial angle $\theta$. The point A constitutes a constantly shifting pole of another set of polar coordinates for the point B; the position of the point B being determined by its coordinates by the length of the radius vector $r$, which is constant, and its vectorial angle $\theta'$. The two radius vectors R and $r$ being of constant length, the variables are the two vectorial angles $\theta$ and $\theta'$. It is therefore obvious that the changes in these angles produced when the arm 3 is swung about the axis of its sleeve 4, and when the arm 2 is swung about the axis of its pivotal connection to the arm 3 will move the torch 1 along an irregular path. When the changes in the vectorial angles are controlled by the record, as hereinafter described, the irregular path will be a geometric figure corresponding to the original record.

Assuming, now, that the means shown in Fig. 3 is the means for tracing the original pattern, and that 1 now represents a portion of a tracing stylus, it will be seen from Fig. 4 that if the arm 2 is somewhat shorter than the arm 3, any pattern can be traced by the point B (representing the tracing stylus) if it lies within the area between the circle X having the radius R+$r$ and the circle Y having the radius R−$r$. In tracing the pattern, any component of movement of the tracing stylus which swings the arm 3 about the axis of its sleeve 4 will turn the gear 5, and this motion will be transmitted to the translating mechanism by the pinion 10 and shaft 11, as later described. Any component of movement of the tracing stylus 1 which swings the arm 2 about its pivotal connection to the end of arm 3, will swing the arm 7 through the link 6 and actuate the shaft 8 to turn the gear 9. This motion will be transmitted to the translating mechanism by the pinion 12 and shaft 13, as hereinafter described.

Figure 2:
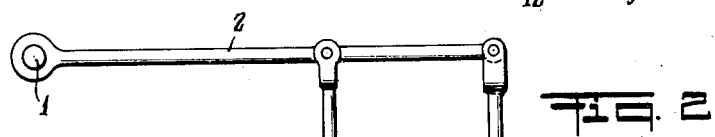
Fig. 2 is a plan view of the apparatus shown in Fig. 1.
Figure 2:
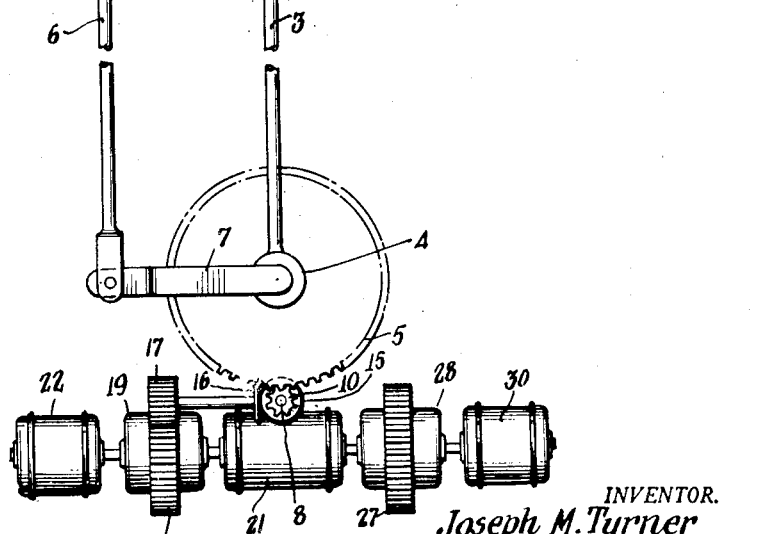

Figs. 1 and 2 show the mechanism of Fig. 3 in association with the preferred form of translating mechanism for translating the motion of the tracing stylus into the alternating currents of varying frequency, or for translating such currents, when regenerated from the record, into mechanical movements that control the path of travel of the torch. As shown in these figures, the above described shaft 11, whose pinion 10 meshes with the gear 5, is operatively connected with another shaft 14 through bevel gears 15 and 16. The shaft 14 carries a gear 17 which meshes with gear teeth 18 on the housing 19 of differential gearing denoted, in general, by the reference numeral 20. This differential gearing is interposed between a synchronous motor 21 and a second synchronous motor 22, which when driven by the motor 21 through the differential gearing operates as a generator to produce an alternating current.

The above described shaft 13, whose pinion 12 meshes with the gear 9, is operatively connected to another shaft 23 through bevel gears 24 and 25. The shaft 23 carries a gear 26 which meshes with gear teeth 27 on the housing 28 of a second set of differential gearing denoted, in general, by the reference numeral 29. This differential gearing is interposed between the above mentioned synchronous motor 21 and a third synchronous motor 30. When the motor 30 is driven by the motor 21 through the differential gearing 29, it serves as a generator to produce an alternating current. The motor 21 is connected to a source of alternating current having a frequency of say, 60 cycles, and operates at a constant speed. When the housing 19 of the differential gearing 20 is at a standstill, the motor 21 drives the generator 22 in the opposite direction through the differential gears 31 in the housing 19, and at a constant speed which will cause the generator to produce a normal output frequency of say, 60 cycles. Similarly, the motor 21 will drive the generator 30 at a constant speed through the differential gears 32 in the housing 28, when this housing is at a standstill, to cause this generator to produce a normal output frequency of say, 60 cycles. The generator 22 is connected by means of conductors 33 to recording apparatus represented diagrammatically at 34, and the generator 30 is similarly connected to the recording apparatus by means of conductors 35.

The recording apparatus may be of any well known type, such as that used in electrically recording sound on disc records, and therefore needs no detail description or illustration. In the recording apparatus, the two alternating currents from the generators 22 and 30 are recorded, preferably on the same record, but in different tracks. Other well known methods of recording sound may be employed to record the two alternating currents, such as magnetic recording on steel wire or tape and photographic recording on film or paper.

It will now be seen that when a pattern is traced to produce a record, the tracing stylus is moved along the outline of the pattern or template, and during its movement, it will either swing the arm 3 (Fig. 3) through the arm 2 and turn the sleeve 4 and gear 5, or through arm 2 and link 6 it will swing arm 7 and turn shaft 8 and gear 9—or it will do both. When gear 5 is thus turned, it will impart rotation to the differential housing 19 (Fig. 1) through the gearing above described. The generator 22 will then no longer be driven at its normal speed by the motor 21, but at a faster or slower speed, depending upon the direction of rotation of the differential housing 19, and the output frequency of generator 22 will therefore be increased or decreased from its normal output frequency of 60 cycles. This change in frequency will of course be reflected in the recording made on the record. The direction in which the differential housing 19 is rotated to either increase or decrease the normal output frequency of the generator 22 depends on whether the component of movement of the tracing stylus is in a direction to turn the gear 5 clockwise, or in the opposite direction to turn this gear counterclockwise. So long as the component of movement of the tracing stylus which turns the gear 5 is at a constant speed, the output frequency of the generator 22 will be constant, but at a different frequency. If such component of motion is at a varying speed the output frequency of the generator 22 will vary accordingly. Similarly, when any component of motion of the tracing stylus 1 turns the gear 9 (through link 6, arm 7 and shaft 8), the motion is transmitted by pinion 12, shaft 13, bevel gears 24 and 25, shaft 23 and gear 26 to the housing 28 of the other differential gearing 29, and this housing will be rotated to increase or decrease the output frequency of the generator 30 from its normal frequency of 60 cycles, depending upon the direction of the component of motion of the tracing stylus. The change in frequency is, of course, reflected in the record made of the alternating current from this generator. As above described, the new frequency may be at a constant level or a varying frequency, depending upon whether the component of motion of the recording stylus, which resulted in turning the differential housing, is at a constant speed or a varying speed.

Figs. 1 and 2 serve to illustrate not only translating mechanism suitable for translating the motion of the tracing stylus into alternating currents of varying frequency, but also translating mechanism suitable for translating the varying alternating currents regenerated from the record into mechanical movements that are transmitted to the torch or other reproducing element, when the pattern is reproduced. In this case, however, the apparatus represented diagrammatically at 34 is not recording apparatus but apparatus adapted to regenerate the alternating currents from the record. Apparatus suitable for this purpose is well known and requires no detailed illustration or description. For instance, an electrical pickup may be employed to regenerate from each undulating track on the record the corresponding alternating current, as is well understood in the reproduction of sound from a record. Each alternating current may be suitably amplified and delivered to the corresponding motor 22 or 30. These are now operating as synchronous motors and not as generators, and are arranged to rotate in the opposite direction from the motor 21. The motor 21 is operated at a constant speed by the 60 cycle current supplied to it. So long as the current supplied to the motor 22 from the regenerating apparatus 34 is at the normal 60 cycle level, the speed of this motor will be constant and the same as the speed of the motor 19. Under these circumstances it is obvious that the differential housing 19 will be at a standstill, and no component of motion will be imparted by it to the torch or other reproducing element 1. Likewise, so long as the current delivered to the motor 30 from the regenerating apparatus 34 is at the normal 60 cycle level, the differential housing 28 will be at a standstill, and no component of motion will be imparted by it to the torch or other reproducing element. However, should the frequency of the regenerated current delivered to the motor 22 increase or decrease, then the speed of this motor will change and the differential housing 19 will rotate, and its motion will be transmitted back to the gear 5, sleeve 4 and arms 3 and 2 to impart a component of motion to the reproducing element 1. This component of motion will be a constant speed so long as the frequency of the current delivered to the motor 22 from the regenerating apparatus 34 remains constant, and will be at a varying speed if such frequency varies. The direction of rotation of the differential housing 19, and consequently the direction of the component of motion transmitted to the reproducing element 1, will depend upon whether the frequency of the current delivered to the motor 22 is above or below the normal 60 cycle frequency, and consequently, on whether the motor 22 operates faster or slower than its normal speed.

Similarly, departures from the normal 60 cycle frequency in the current regenerated by the apparatus 34 and delivered to the motor 30 will result in rotation of the differential housing 28 in one direction or the other to rotate the gear 9 through the gearing above described, and impart a component of motion to the reproducing element 1 by means of the shaft 8, arm 7, link 6 and arm 2, in a direction depending upon the direction of rotation of the differential housing, and at a constant or varying speed depending upon whether the changed frequency of the current delivered to the motor 30 is at a constant level or at a varying level. When the two motion components transmitted to the reproducing element, as just described, are compounded, the reproducing element will describe a geometric figure which corresponds to the original pattern. Obviously, the two recordings of the alternating currents on the record must be rigidly coupled because any relative displacement would result in dissimilarity between the reproduced geometric figure and the original pattern. Moreover, if the coordinate system on which the tracing and reproducing mechanism (shown in Fig. 3) is based includes at least one angular ordinate, then the tracing and reproducing of the pattern should start from the same point in the coordinate system. It is not necessary to observe this, however, when the system is based on rectilinear or oblique coordinates.

A number of geometric figures may be simultaneously reproduced by one operation of a single record by connecting a number of the reproducing elements to a single actuating member, in somewhat the same manner that a number of cutting torches are frequently connected to the torch bar of a universal cutting machine to cut the metal at a number of places simultaneously in accordance with the movement of the tracer along the outline of a single pattern.

One of the advantages of the system above described is that the frequencies cannot be distorted in any way by amplification, and the reproduced geometric figure will not be a distortion of the original pattern. However, this would not be true if a certain amplitude were assigned to a certain motion component and the recording were made on the amplitude principle, because then any distortion by amplification would be reflected in a distortion of the reproduced figure.

Another advantage of the system above described is that reversal of the direction of the motion components of the reproducing element is attained, not by reversing the direction of rotation of the motors 22 and 30, but simply by altering their speed, either to a level above or below their normal speed. Also, zero movement of the reproducing element is obtained, not by stopping the motors 22 and 30, but by operating them at the normal speed. In this way the problem of starting and reversing the synchronous motors is avoided.

Means other than the pivoted arm and link arrangement shown in Fig. 3 may, of course, be used for transmitting the motion components of the tracing stylus to the translating mechanism and for imparting the motion components to the torch or other reproducing element. For instance, a double rectilinear motion device of any well known type may be used, such as that used in certain kinds of universal flame cutting machines. Moreover, although the particular kind of translating mechanism herein illustrated and described has a number of advantages, other means could be employed for changing the mechanical movements of the tracing stylus into alternating currents of varying frequency for recording and for changing the alternating currents of varying frequency, when regenerated from the record, into mechanical motion which will produce the required motion components of the reproducing element.

The apparatus may be used for other purposes than cutting metal sheets or plates by means of an oxyacetylene cutting torch. For instance, it may be used in the garment industry for cutting cloth according to a particular pattern that has been previously traced and recorded in the manner above described. In fact, it may be used in most any relation where it is desired to cause some device or element to follow a path, and in so doing, describe a geometric figure having a configuration corresponding to that of a given pattern.

I claim:

1. Apparatus of the kind described comprising a tracing element for use in tracing a given pattern, a pair of alternating current generators, means for normally driving said generators at a substantially constant speed so that they have a normal predetermined output frequency, said last named means comprising differential gearing for each generator through which such generator is driven, the differential gearing for each generator having a rotary housing, means actuated by the movement of said tracing element when tracing a pattern for rotating said housings in accordance with the movement of the tracing element to thus vary the speed of the generators and their output frequency, and means for recording on a record the alternating currents thus generated and varied in frequency.

2. Apparatus of the kind described comprising a tracing element for use in tracing a given pattern, a synchronous motor, a pair of alternating current generators arranged to be driven by said motor, differential gearing between the motor and each of the generators, each set of differential gearing having a rotary housing, said generators being normally driven by said motor through the differential gearing at a constant speed so that they generate alternating currents having a normal predetermined frequency, means actuated by the movement of said tracing element when tracing a pattern for rotating said differential housings in accordance with the movement of the tracing element to thereby vary the speed of the generators and change the frequency of their generated currents, and means for recording on a record the alternating currents thus generated and varied in frequency.

3. Apparatus of the kind described comprising a tracing element for use in tracing a given pattern, a pair of alternating current generators, means for normally driving said generators at a substantial constant speed so that they have a normal predetermined output frequency corresponding to zero movement of the tracing stylus, means actuated by the movement of said tracing element when tracing a pattern and adapted to increase the normal speed and normal output frequency of at least one of said generators when components of movement of the tracing element are in one direction and adapted to decrease the normal speed and normal output frequency of at least one of the generators when such components are in the opposite direction, and means for recording on a record the alternating currents thus generated and varied in frequency.

4. Apparatus of the kind described comprising a synchronous motor adapted to be driven at constant speed, a pair of additional synchronous motors, differential gearing operatively connecting said first mentioned motor with each of said additional motors, each set of differential gearing having a rotary housing, means for regenerating from a record two alternating currents the frequency of each of which varies above and below a normal predetermined frequency, each of said additional motors being driven by one of said alternating currents in a direction opposite to that in which said first mentioned motor is driven, and each of the additional motors being adapted to operate at the same speed as said first mentioned motor when the alternating current delivered to it from the record is at its normal frequency whereby the corresponding differential housing is then at a standstill but being adapted to operate faster or slower when the frequency of the current delivered to it increases or decreases from normal to thereby rotate the corresponding differential housing in one direction or the other, a reproducing element adapted to be moved in a given plane to describe a geometric figure, and means operatively connected to said differential housings for imparting components of motion to said element when said housings are rotated to cause it to describe said geometric figure.

5. Apparatus of the kind described comprising means for regenerating from a record two alternating currents the frequency of each of which varies above and below a predetermined normal frequency, a pair of synchronous motors each of which is adapted to be operated by one of said currents so that when the current delivered to it is at said normal frequency it rotates at a predetermined normal speed and when the current delivered to it is higher or lower in frequency than the normal frequency it rotates correspondingly faster or slower than its normal speed, a reproducing element adapted by its movement in a given plane to describe a geometric figure, two actuating mechanisms for imparting components of motion to said element which cause it to describe said geometric figure, and means operatively connecting each synchronous motor with one of said actuating mechanisms and adapted when either motor is rotating at its normal speed to impart no motion to the corresponding actuating mechanism but adapted when such motor rotates at a speed greater than its normal speed to actuate the corresponding actuating mechanism in one direction and when it rotates at a speed less than its normal speed to actuate the corresponding actuating mechanism in the opposite direction.

JOSEPH M. TYRNER.

REFERENCES CITED

The following references are of record in the file of this patent:

UNITED STATES PATENTS

| Number | Name | Date |
| --- | --- | --- |
| 1,686,327 | Illauer | Oct. 2, 1928 |
| 2,116,593 | Bouvier | May 10, 1938 |
| 2,213,108 | Pollard | Aug. 27, 1940 |
| 2,286,571 | Pollard | June 16, 1942 |
| 2,411,147 | Cooley | Nov. 19, 1946 |